Patented Mar. 5, 1940

2,192,490

UNITED STATES PATENT OFFICE 2,192,490

DERIVATIVES OF 4-AMINOBENZENESULPHONAMIDES AND PROCESS FOR THE MANUFACTURE OF SAME

Kurt Warnat, Basel, Switzerland, assignor to Hoffmann-La Roche Inc., Nutley, N. J., a corporation of New Jersey No Drawing. Application March 19, 1937, Serial No. 131,962. In Germany March 21, 1936

8 Claims. (Cl. 260—556)

It has been found that the hitherto unknown basic amides of sulphanilic acid exert a strong bactericidal action. According to experiments carried out by Tréfouël, Nitti and Bovet (Comptes rendus Soc. Biol. 120 [1935] page 756) the amide of sulphanilic acid also possesses a definite bactericidal action on streptococci. It does not attain the bactericidal action exerted by the basic amides of sulphanilic acid. These basic amides have the particular advantage that their salts are readily soluble in water giving neutral or nearly neutral solutions, so that they are suitable for injection. The salts of the simple amides of sulphanilic acid, on the other hand, react in aqueous solution strongly acid to Congo paper and cause damage on account of their acidity, as has also been established by Tréfouël (Comptes rendus Soc. Biol. 120 [1935] page 758 top).

The manufacture of strongly bactericidal sulphanilic acid amides claimed is achieved by the conversion of sulphanilic acid and its derivatives into amino anilides.

This process may be carried out by causing 4-acylaminobenzenesulphonyl halides to react with aromatic diamines or their mono-acyl derivatives, or with amino-nitro-benzene derivatives and splitting off the acyl groups before or after reduction of the nitro-group if present. Moreover, 4-amino- or 4-acylamino-benzenesulphon-anilide can be converted to the nitro-anilide by nitration and the nitro-group reduced previous or subsequent to removal of any acyl radicles present. The compounds can also be prepared from 4-acylaminobenzenesulphonamides by reaction with N-acyl halogen-anilines, or with halogen substituted nitro-benzenes in presence of catalysts in either case, and de-acylating the reaction-products before or after reducing the nitro-group if present. A further method of preparation consists in causing the halogen of p-halogen-benzenesulphonanilide derivatives of the general formula XC6H4SO2NHC6H4Y where X is halogen and Y is an amino, acylamino or nitro group to react with ammonia or amines with the help of catalysts and removing the acyl group or reducing the nitro group when present.

The new compounds are to be used as internal disinfectants.

Example 1

50 parts by weight of the crude moist 4-acetaminobenzenesulphonyl-chloride, prepared from acetanilide and chlorsulphonic acid, are allowed to react with 70 parts by weight of p-phenylenediamine with gradual addition of a solution of sodium hydroxide. The product is then neutralized with hydrochloric acid and the precipitated reaction product sucked off. It is saponified by boiling with 15% hydrochloric acid. The difficultly soluble hydrochloride of di(p-aminobenzosulphonyl) p-phenylenediamine formed as a by-product in small quantities is filtered off and the filtrate treated with ammonia. The crystalline 4-aminobenzenesulphon-4'-aminoanilide is sucked off and recrystallized from water. It melts at 138° C. and has the formula:

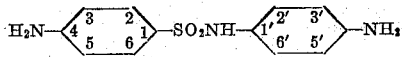

Example 2

50 parts by weight of nearly dry 4-acetaminobenzenesulphonyl chloride are condensed with 50 parts by weight of p-aminoacetoanilide in 100 parts by weight of methyl alcohol at 30–50° C. while adding a solution of caustic soda at such a rate that the mixture never becomes alkaline. Excess of caustic soda is then added while cooling and the product diluted with 400–500 parts of water. After standing awhile the unchanged p-aminoacetanilide is filtered off. The filtrate is neutralized by the addition of acid and the 4-acetaminobenzenesulphon-4'-acetaminoanilide is saponified by boiling with a 10% solution of caustic soda. The 4-aminobenzenesulphon-4'-aminoanilide described in Example 1 is obtained.

Example 3

35 parts by weight of nearly dry 4-benzoylaminobenzenesulphonyl chloride, 25 parts by weight of m-nitraniline and 10 parts by weight of anhydrous sodium acetate are mixed well and heated to 110–130° C. 250 parts by weight of a 10% solution of caustic soda are then added and boiled for 1–2 hours under a reflux condenser. The crude 4-aminobenzenesulphon-3'-nitroanilide is recrystallized from dilute methyl alcohol. Melting point 171–172° C.

The 4-aminobenzenesulphon-3'-nitro-anilide is hydrogenated in methyl alcohol with a nickel catalyst. The resulting 4-aminobenezenesulphon-3'-aminoanilide is recrystallized from water. This compound has a melting point of 158° C. to 160° C. and has the formula:

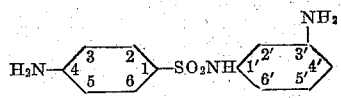

Example 4

15 parts by weight of 4-aminobenzenesulphon anilide are dissolved in 300 parts by weight of concentrated sulphuric acid at —10° C. and nitrated with a mixture of 6 parts by weight of nitric acid s. g. 1.4 and 20 parts by weight of concentrated sulphuric acid. After the nitration is completed the product is poured into 2000 parts of ice-water and a dinitro derivative of 4-aminobenzenesulphon anilide which is insoluble in dilute acid is obtained as a byproduct in small quantities. The acid filtrate is neutralized by the addition of alkali, whereupon 4-aminobenzenesulphon-4'-nitroanilide is precipitated. It is recrystallized from dilute methyl alcohol. By reduction with zinc dust or catalytic hydrogenation, 4-aminobenzenesulphon-4'-nitroanilide is converted into the 4-aminobenzenesulphon-4'-aminoanilide of Example 1.

Example 5

20 parts by weight of 4-acetaminobenzenesulphon amide, 20 parts by weight of p-brom-acetanilide, 12 parts by weight of potassium carbonate and 1 part by weight of copper-bronze are well mixed and heated to 180–200° C. After cooling, the mass is dissolved in 300 parts by weight of a 5% solution of caustic soda and matter insoluble in alkali is filtered off. 4-acetaminobenzenesulphon-4'-acetaminoanilide is obtained on neutralizing. It is saponified by boiling for an hour with 100 parts by weight of a 10% solution of caustic soda. The crude 4-aminobenzenesulphon-4'-amino anilide is recrystallized from water, and is identical with the product of Example 1.

Example 6

50 parts by weight of 4-acetaminobenzenesulphon amide, 40 parts by weight of o-chloro-nitrobenzene, 20 parts by weight of potassium carbonate and 1 part by weight of copper-bronze are boiled in 200 parts by weight of nitro-benzene for a few hours. Then the nitro-benzene is removed by steam-distillation and the residue dissolved in 500 parts by weight of a 5% solution of caustic soda. Small quantities of undissolved matter are filtered off. The 4-acetaminobenzenesulphon-2'-nitroanilide is precipitated from the filtrate by addition of acid and the acetyl group split off by boiling with 200 parts by weight of a 10% solution of caustic soda. The crude 4-aminobenzenesulphon-2'-nitroanilide is recrystallized from methyl alcohol and melts at 175° C. By hydrogenation 4-aminobenzenesulphon-2'-aminoanilide is obtained. This compound has a melting point of 201° C. and the following formula:

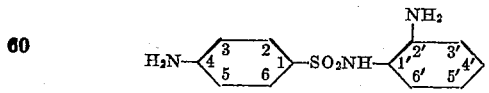

Example 7

6 parts by weight of 4-chloro-benzenesulphon-4'-acetamino-anilide, 0.5 part by weight of copper-bronze and 15 parts by weight of 30% monomethylamine solution are heated to 170–175° C. An excess of a solution of caustic soda is then added and undissolved matter filtered off. For the purpose of splitting off the acetyl group the product is boiled for an hour. The cooled solution is neutralized and the crude 4-methylaminobenzenesulphon-4'-aminoanilide recrystallized from dilute methyl alcohol. This compound has a melting point of 191° C. to 193° C. and has the formula:

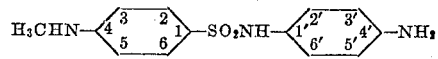

Example 8

6 parts by weight of 4-chloro-benzenesulphon-4'-nitroanilide, 0.3 part by weight of cuprous chloride and 20 parts by weight of concentrated ammonia are heated to 160–170° C. for 10–12 hours. Then an excess of a solution of caustic soda is added and undissolved matter filtered off. The alkaline solution is neutralized by the addition of acid and the precipitated crude product sucked off. It is dissolved in excess of hot dilute hydrochloric acid and the unreacted 4-chlorobenzenesulphon-4'-nitroanilide which remains undissolved is filtered off. The filtrate is neutralized and the 4-aminobenzenesulphon-4'-nitroanilide hydrogenated in presence of nickel in methyl alcoholic solution, when the 4-aminobenzenesulphon-4'-aminoanilide of Example 1 is obtained.

Example 9

15 parts by weight of 1-amino-2,3-dimethyl-4-acetaminobenzene dissolved in 50 parts by weight of methyl-alcohol and the calculated quantity of crude moist 4-acetaminobenzenesulphonyl chloride added and the reaction completed by gradually adding dilute sodium hydroxide solution. The alkaline solution is filtered and neutralized. 4-acetaminobenzenesulphon-2',3'-dimethyl-4'-acetaminoanilide is precipitated as an oil and hydrolysed by boiling for an hour with 100 parts of 15% hydrochloric acid. The acid solution is neutralized and the 4-aminobenzenesulphon-2',3'-dimethyl-4'-aminoanilide precipitated is sucked off and recrystallized from dilute methyl alcohol. This compound has a melting point of 169° C. and has the structure:

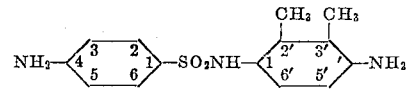

Example 10

20 parts by weight of 1-amino-2-methyl-5-acetaminobenzene in 50 parts by weight of methylalcohol is condensed with the calculated amount of crude moist 4-acetaminobenzenesulphonyl-chloride by addition of dilute sodium-hydroxide solution. The alkaline solution of the condensation-product is filtered and the 4-acetaminobenzenesulphonyl-2'-methyl-5'-acetaminoanilide precipitated on acidification. It is hydrolysed by boiling with 15% hydrochloric acid and the 4-aminobenzenesulphonyl-2'-methyl-5'-aminoanilide recrystallized from dilute alcohol. This compound has a melting point of 205° C. to 206° C. and has the structure:

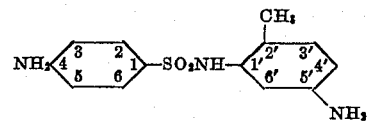

Example 11

30 parts by weight of 1-amino-3-methyl-6-acetaminobenzene are dissolved in 100 parts by weight of methyl alcohol and treated with 100 parts by weight of crude moist 4-acetaminobenzenesulphonyl-chloride, dilute sodium hydroxide solution being added. The alkaline solution is filtered, the condensation-product precipitated by addition of acid and hydrolised by boiling for an hour with 150 parts by weight of 15% hydrochloric acid. The 4-aminobenzenesulphon-3'-methyl-6'-aminoanilide is precipitated from the acid solution by neutralization with ammonia. It is filtered off with suction and recrystallized from 80% methylalcohol. This compound melts at 187° C. and has the structure:

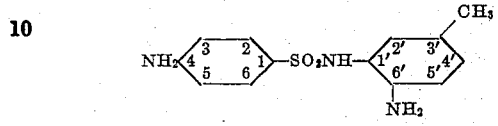

*Example 12*

60 parts by weight of 4-amino-N,N-dimethyl-aniline in aqueous solution are mixed with 200 parts by weight of crude moist 4-propionamino-benzenesulphonyl-chloride and excess of sodium hydroxide solution gradually added. The alkaline solution is filtered and the condensation-product precipitated by addition of acid. It is hydrolised by boiling with 500 parts by weight of 15% hydrochloric acid and 4-aminobenzenesulphon-4'-dimethylamino-anilide obtained on neutralization. This compound melts at 231° C. to 232° C. and has the structure:

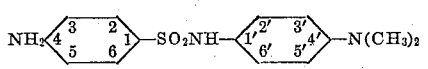

In the above example the amino-N,N-dimethyl-aniline can be replaced by 4-amino-N,N-diethyl-aniline or 4-amino-methyl-acetanilide to produce 4-aminobenzenesulphon-4'-diethylamino-anilide or 4-aminobenzenesulphon-4'-monomethylaminoanilide.

I claim:

1. A compound of the structure

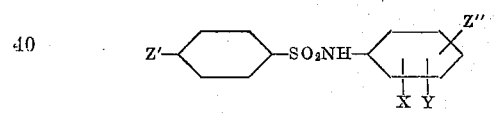

wherein X and Y are radicals selected from the group consisting of hydrogen and lower alkyl radicals, and Z' and Z'' are radicals selected from the group consisting of $-NH_2$, $-NHCH_3$, $-N(CH_3)_2$, $-NHCOCH_3$, $-NHCOCH_2CH_3$ and $-NHCOC_6H_5$.

2. A compound of the structure

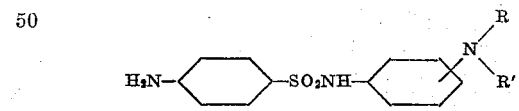

wherein R and R' are radicals selected from the group consisting of hydrogen and methyl radicals.

3. A compound of the structure

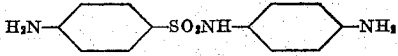

4. A compound of the structure

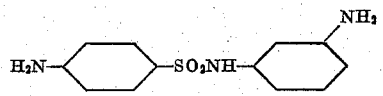

5. A compound of the structure

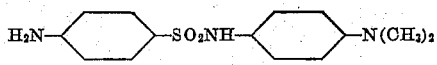

6. In a process for the manufacture of a compound of the structure

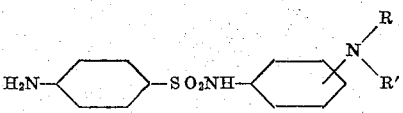

wherein R and R' are radicals selected from the group consisting of hydrogen and methyl radicals, the steps comprising reacting a compound of the structure

wherein Ac represents acyl radicals selected from the group consisting of $CH_3CO-$, $CH_3CH_2CO-$, $C_6H_5CO-$, with a compound of the structure

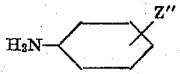

wherein Z'' is a radical selected from the group consisting of $-NH_2$, $-NHCH_3$, $-N(CH_3)_2$, and $-NHAc$ and splitting off the acyl groups.

7. A process for the manufacture of 4-aminobenzenesulphonaminoanilides which comprises reacting an N-acyl-benzene-sulphonyl halide with an aromatic compound selected from the group consisting of aromatic diamines of the phenyl series and their N-mono-acyl derivatives and splitting off the acyl radicals, the acyl radicals being selected from the group consisting of acetyl, benzoyl and propionyl radicals.

8. A process for the manufacture of 4-aminobenzenesulphonyl-4'-aminoanilide which consists in reacting 4-acetaminobenzenesulphonyl chloride with acetyl-p-phenylenediamine and splitting off the acetyl groups.

KURT WARNAT.